March 19, 1968            G. B. DOREY            3,373,884
SELECTIVE PNEUMATIC AND GRAVITY UNLOADING HOPPER CAR
Filed Feb. 14, 1966            4 Sheets-Sheet 4
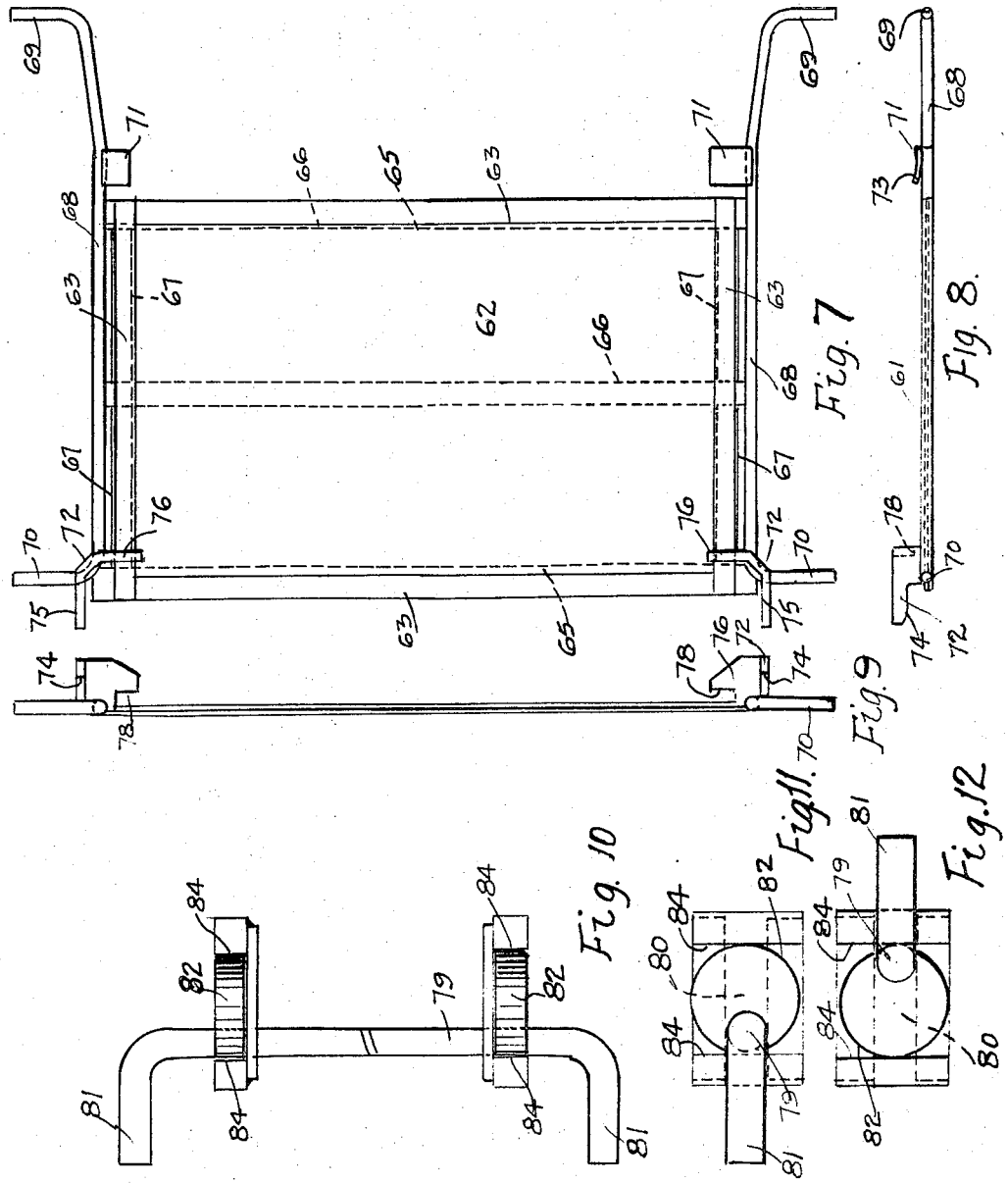
INVENTOR
George B. Dorey

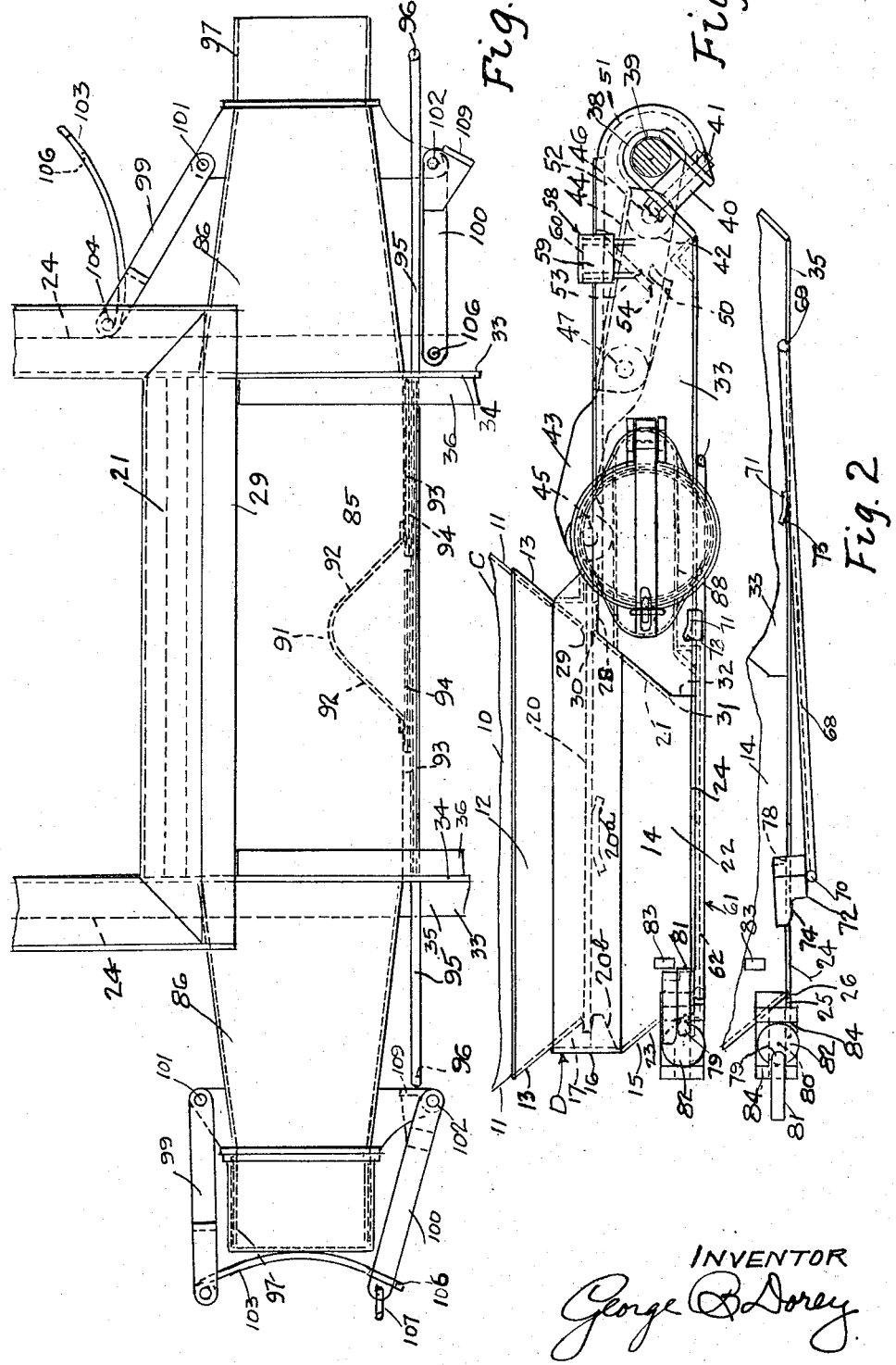

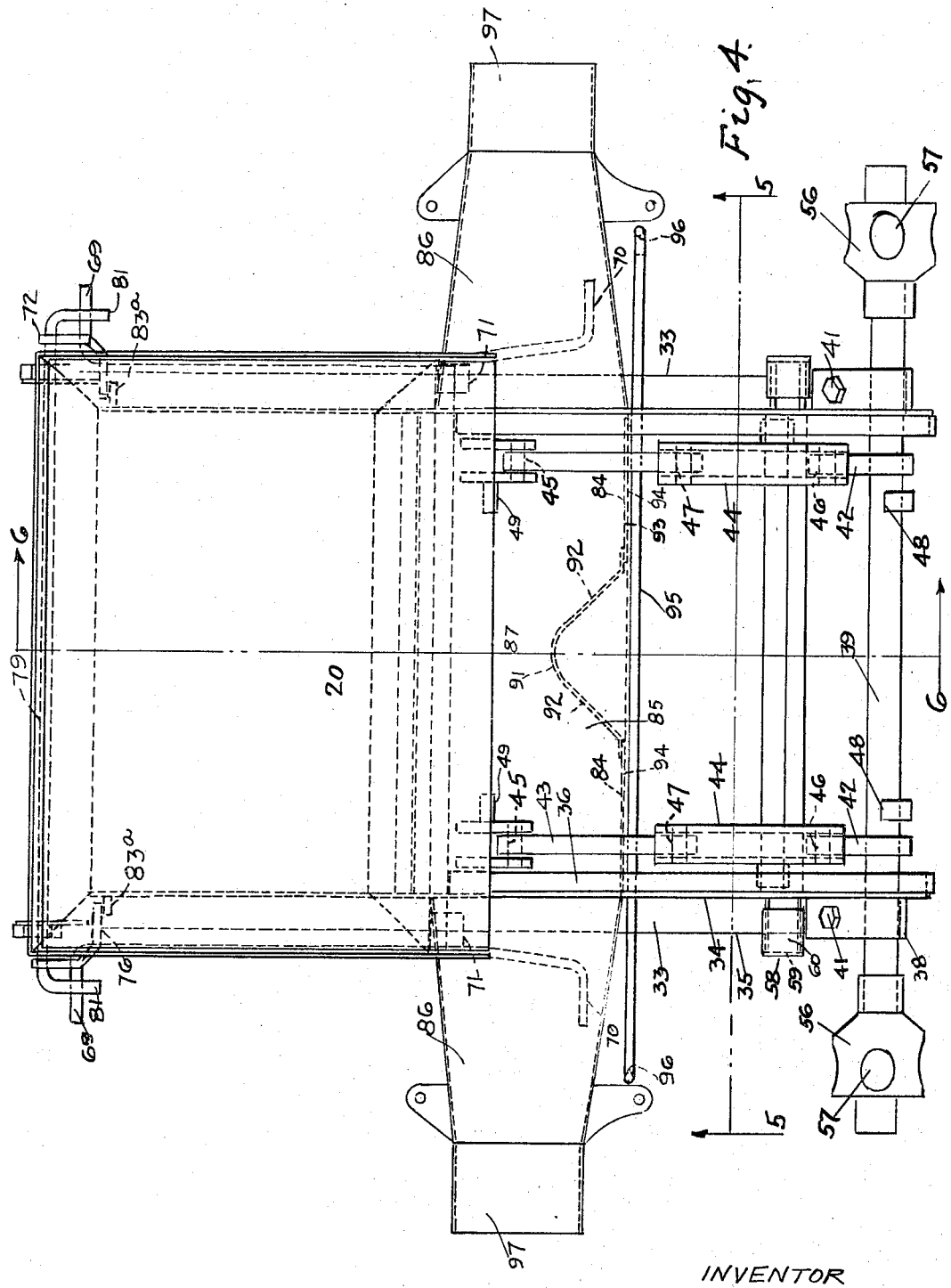

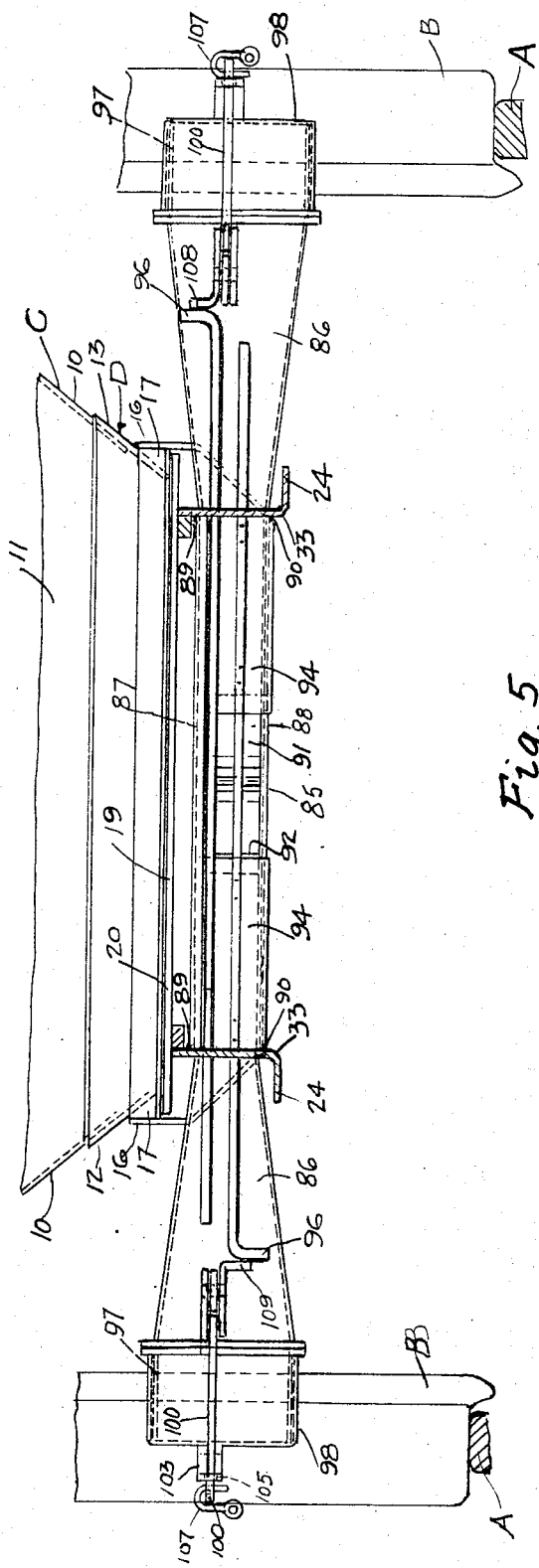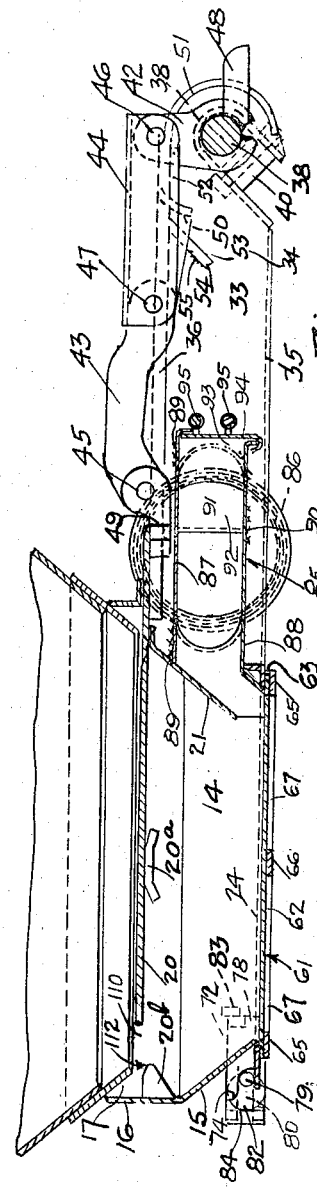

United States Patent Office 3,373,884
Patented Mar. 19, 1968

3,373,884
SELECTIVE PNEUMATIC AND GRAVITY
UNLOADING HOPPER CAR
George B. Dorey, Westmount, Quebec, Canada, assignor
to Continental Transport Appliances Limited, Montreal, Quebec, Canada, a corporation of Canada
Filed Feb. 14, 1966, Ser. No. 526,996
4 Claims. (Cl. 214—83.18)

The invention relates to a selective pneumatic and gravity unloading hopper car which may be unloaded at destination by either method without pre-arrangement of parts at loading site.

The objects of the invention among others are to adapt a gravity discharging car for pneumatic unloading without unduly impairing the efficiency of the car as a self discharging gravity car; to adapt the conventional type of four-sided discharge chute now in common use to pneumatic unloading by the addition of an exteriorly disposed conduit in communication with one of the walls of said chute and incorporating features producing a venturi effect; to make provision for directing a stream of entraining air along the sloping sides of a heap of lading emanating from the discharge chute and lying along the communicating opening at the angle of repose; to provide air inlet valves operable from a location proximal to air and lading exit openings; and to provide for conjointly latching air inlet valves with air and lading exit openings.

Other objects of the invention are to provide a closure member for the lower part of a discharge chute which may be readily shifted lengthwise along laterally extending ledges forming part of the car structure; to provide hangers at the opposite ends of the closure extending over and above horizontal ledges; to provide means for forcing the closure into tight sealing relation with the boundaries of the discharge chute; and to provide for limited downward swinging movement of the closure to free it from its sealing engagement and facilitate bodily movement thereof.

The invention further resides in the specific type of latching mechanism employed for latching the closure involving a bodily movable shaft and cooperating shouldered means on the closure.

For further comprehension of the improvement reference may be had to the accompanying drawings wherein:

FIGURE 1 is a vertical longitudinal side view of the lower portion of a railway hopper car incorporating the improvement, said view having the operating handle eliminated to better illustrate the parts.

FIGURE 2 is a fractional view of the lower part of FIGURE 1 showing the bodily shiftable floor member in partially open position.

FIGURE 3 is a fractional plan view of FIGURE 1 showing so much of the structure as necessary to show the pneumatic part of the system, said view being shown with the sliding gate and upper section of the assembly eliminated.

FIGURE 4 is a plan view of FIGURE 1 with the caps of the conduit tubes and the frame top section eliminated.

FIGURE 5 is a vertical transverse sectional view of the assembly as taken on a line 5—5 of FIGURE 4, with the gate linkage and attachments eliminated.

FIGURE 6 is a vertical longitudinal transverse sectional view showing the gate in partially opened position as taken on a line 6—6 of FIGURE 4.

FIGURE 7 is a detached plan view of the bodily shiftable floor member.

FIGURE 8 is a side elevational view of FIGURE 7.
FIGURE 9 is an end elevational view of FIGURE 7.

FIGURE 10 is a plan view on an enlarged scale of the latching mechanism for the floor member.

FIGURE 11 is a side elevational view of FIGURE 10.

FIGURE 12 is a view similar to FIGURE 11 except that the shaft is shown in full latching position.

In said drawings the rails on which the car is mounted are shown at A and the wheels at B and the body of the main hopper of the car is shown at C. The hopper C is generally of inverted truncate shape including longitudinally and transversely downwardly inwardly converging walls 10 and 11 respectively. An outlet assembly D incorporating the improvement is shown as including a four-sided inverted truncate shaped upper portion with walls 12 and 13 overlying the respective walls 10 and 11.

The walls 12 and 13 nest within a three-sided enclosure formed of longitudinally extending laterally spaced side walls 14—14 and an end wall 15. The said walls 14—14 and 15 extend upwardly to present vertical wall sections 16 which are welded to the underside of walls 12 and 13 at a midway location thereof thereby forming triangular shaped housings 17 at the upper end of walls 14 and 15. The lower margins of walls 12 and 13 define the boundaries of a discharge opening 19 which is adapted to be closed by a sliding gate 20.

The walls 14, 15 and 16 form a three-sided enclosure between which the gate 20 is adapted to lie when in closed position. The walls 14—14 and 15 are united by a transverse wall member 21 at the end of the enclosure remote from end wall 15 thereby forming with walls 14—14 and 15 a four-sided chute-like extension of appreciable depth.

The walls 14 and 15 converge downwardly inwardly from the upper vertical sections 16 to present inwardly sloping floor sections as indicated at 22 and 23 respectively. The sloping sections 22 of side walls 14—14 are flanged outwardly to form outwardly extending marginal ledges 24. The lower margin of sloping end floor section 23 is likewise reinforced by an outwardly extending plate member 25 which is preferably welded thereto as at 26.

The opposite end wall member 21 includes a main wall section 27 sloping downwardly inwardly and flanged outwardly at its upper end as seen at 28 to present a substantially horizontally disposed wall underlying the gate 20. The said upper flange 28 in combination with the marginal edge 29 of the sloping upper wall 13 forms a slotted opening 30 within which the gate 20 extends. The lower margin 31 of the sloping section 27 terminates a short distance above the lower part of the side walls 14—14 to form an opening 32 for communicating with the central part of a transversely extending conduit as will be described.

The gate 20 is supported in closed position by means of lugs 20$^a$ and 20$^b$ carried by the side and end walls 14 and 15 respectively.

A pair of spaced apart beam members 33—33 which extend forwardly from the sloping end wall section 27 form supports for the gate in opened position. The beam members 33 each include a web 34 and a laterally outwardly extending lower marginal flange 35 disposed in alignment with the flange 24 of side walls 14 and forming a continuation thereof. Supporting rail members 36 for the gate are positioned on the inner side of the web 34 and welded thereto as at 37. The beam members 33—33 adjacent their distal end are provided with shaft bearings 38 for rotatably supporting an operating shaft 39. The said bearings 38 are of the open end type fitted with bearing blocks 40 which in turn are held in place by bolts 41.

The shaft 39 is provided with non-rotatably mounted radial arms 42 which connect with the gate 20 through the medium of linkage which preferably consists of two links as indicated at 43 and 44. The link 43 is connected at one end with the gate as seen at 45 and at its opposite end connects with link 44. The link 44 is preferably of inverted U shape and straddles the radial arm 42 and link 43 and is pivotally connected with said respective members as seen at 46 and 47 respectively.

Opening movement of the gate 20 is effected by winding the linkage consequent on rotary movement of the shaft in a clockwise direction as viewed in FIGURES 1 and 6. The extent of door opening movement is limited by detent members 48 non rotatably carried by the shaft and adapted to engage with abutments 49 on the gate.

The closing movement of the gate is effected by reversal of the shaft rotation whereupon the detents 48 act on abutments 49 to initiate the gate closing operation. Unfolding movement of the linkage in proper sequence is positively assured by reason of laterally extending arcuate shaped lugs 50 positioned on links 44 and adapted to successively engage with trackways 51, 52 and 53. The trackways 51 are concentrically related to the axis of the operating shaft and merge into trackway 52 which preferably is formed by the undersurface of rail members 36 and trackway 53 is preferably formed by the proximate surface of a downwardly inclined bar 54 welded to the inner surface of the beam members 33 at 55.

Operating heads 56 having a series of socket openings 57 for the accommodation of a removable operating bar (not shown) are fitted on the opposite ends of the operating shaft.

The gate 20 is retained against upward bouncing by means of angle shaped clips 58 having one flange 59 secured to the outer face of the related beam 33 and the adjacent flange 60 disposed to overlie the gate.

Conversion of the outlet from gravity to pneumatic discharge involves closure of the final discharge opening and to this end a bodily movable closure member 61 having limited swinging movement is positioned to complete in combination with the four-sided chute and the sliding gate a vacuum chamber.

The floor member 61 as seen in detached relation in FIGURES 7 to 9 inclusive generally includes a flat plate body portion 62 bordered by resilient gaskets 63 and reinforced on its underside by flat bar members as seen at 65, 66 and 67. The members 65 protrude slightly beyond the gaskets 66 and are united with side bar frame members 68 having laterally extending handles at the distal ends thereof as at 69 and 70.

Brackets 71 and 72 respectively disposed at the opposite ends of the member 61 operate as supports to hold the said member on the laterally outwardly extending ledges 24 of side walls 14 and aligned ledges 35 of beam members 33. The brackets 71 are in the form of plates having a curved outer end 73 to allow limited downward swinging movement of the floor member. The brackets 72 at the swinging end of the floor member preferably combine with latching shoulders 74 and to this are formed of angularly related walls 75 and 76 with wall 75 contoured to form the locking shoulder 74 and wall 76 is disposed at an angle thereto and spaced as at 78 to lie above the ledges 24 when the member is in latched relation. The spacing 78 thus allows the latching end of the floor member to swing downwardly and free the resilient gaskets 63 from contact with the undersurface of the supporting ledges thereby permitting free bodily translation movement of the floor member.

The brackets 71 are preferably spaced rearwardly from the gaskets a short distance in order to effect tight sealing engagement between the resilient gaskets incidental to an upward swinging of the closure. The latching mechanism includes a shaft element 79 movable by rotation in slotted bearings 80 to engage with the shouldered ends 74 of latching brackets 72.

The shaft element 79 and associated mechanism, as best seen by reference to FIGURES 10 to 12 inclusive is formed at each end with a handle portion 81 and intermediate said handles circularly shaped cams 82 are rigidly secured to the shaft in eccentric relation thereto. The shaft is mounted to move in the elongated bearings 80 and between vertical bearing walls 84—84 and upon rotation of the shaft through half a revolution, as will be seen by reference to FIGURES 11 and 12, the shaft is moved throughout the length of the elongated bearings 80. Stops 83 are provided on the outlet structure for engagement with the closure member and limit rearward movement thereof incidental to the operation of the latching means.

Referring now to the structure more particularly identified with pneumatic unloading operation, it will be noted that an air and lading exit conduit in three sections is provided including a central portion 85 lying between the spaced side wall extension members 33—33 and side portions 86—86. The central portion 85 preferably consists of a box-like casing structure having upper and lower walls as seen at 87 and 88 respectively disposed to extend between the members 33—33 and welded thereto at 89 and 90. The walls 87 and 88 are further maintained in vertical spaced relation by a vertically extending V shaped partition 91 presenting inclined walls 92—92 disposed at an angle to the walls 33—33. The ends of walls 92—92 are spaced from the walls 33—33 to form air inlet openings 93 adjacent the ends of the casing section. The V shaped partition 91 operates to restrict the size of the air passage to midway of the casing and of the opening 32 thereby producing a venturi effect to direct entraining air under increased velocity along the heap of lading deposited by gravity along the communicating opening 32.

The air inlet openings 93 are adapted to be closed by sliding valves 94 and in order to ensure maximum sweeping movement of the air along the entire heap of lading provision is made for operating the remotely disposed valve from a location adjacent the air and lading exit of the conduit thereby providing for the entrance of air at the end of the communicating opening remote from the exit end. Control rods 95 are fitted to the valves and extend in crossed relation through the walls 33 towards the exit ends of the conduit and at the distal end are formed with handles 96. The exit end of the side conduit sections which extend laterally from the outer face of walls 33 are provided at the outer end with a tubular section 97 for connection with a source of reduced pressure (not shown). A hollow closed end cap 98 is placed on the end of each said tubular section and held in place by a collapsible yoke composed of swinging link members 99 and 100 respectively pivotally mounted on opposite sides of the conduit as indicated at 101 and 102 respectively.

A curved resilient bar 103 is pivotally connected at 104 to the distal end of link 99 and at the opposite end is slotted at 105 for receiving the end of link 100 therethrough. The projecting end of link 100 is apertured at 106 for receiving a sealing hook 107 and thereby resiliently holding the cap in place.

The said link members 100 are each provided with locking lugs as indicated at 108 and 109 respectively for engaging with the handle portion 96 of the valve control rods 95 and thus conjointly latching each cap and remotely disposed inlet valve. The interlocking latching arrangement between the caps and remotely located inlet valves thus enables control of the entraining air from the air and lading exit station.

The operation and advantages of the improved pneumatic arrangement may be best understood by following the progress of an unloading operation. Assuming the arrival of a loaded car at the unloading site and the shiftable closure in sealing position at the lower part of the chute receptacle and the cap latching mechanism released as seen in the right hand part of FIGURE 5, the sliding gate 20 is opened allowing lading to fall into the chute receptacle. The lading then flows towards the communicating opening 33 and extends in the conduit forming a heap extending throughout the length of the opening 33 at the angle of repose of the lading. With the exit end of the conduit connected with a source of reduced pressure and the establishment of a state of vacuum in the conduit system accompanied by the flow of entraining air from the far inlet, a stream of air passes over the heap of lading and the air and lading are then drawn through the conduit.

It is to be understood that during the unloading operation one or more hatch covers used for loading are opened and with certain types of lading there is movement of air through the lading. Continued unloading finally uncovers opening 33 to the air from the hatch openings and entrainment of lading ceases whereupon the operator closes the air inlet valve and moves the gate 20 towards closed position at a controlled rate to maintain an entraining air flow between the leading end of the gate and the lading. The sliding gate eventually approaches the nearly closed position as seen in FIGURE 6.

The chute receptacle then becomes the end of the conduit system with the opening 110 at the extreme end thereof functioning as the air inlet for entry of air as indicated at 112. This arrangement operates for increased suction and complete evacuation of lading and leaves the car in clean condition in readiness for reloading.

What is claimed as new is:

1. In a hopper car having an opening for selective discharge of lading either by gravity or pneumatic action, in combination,
    (a) a sliding gate for the opening;
    (b) a four-sided chute-like receptacle below the gate for directing the flow of lading from the discharge opening,
    (c) one of the sides of the receptacle extending transversely beneath the gate,
    (d) laterally spaced extension wall members projecting forwardly from the said transverse wall to support the gate in open position,
    (e) a shiftable floor member arranged to funtion in one position as closure for the receptacle for operation as a pneumatic unloader and shiftable to a storage position beneath the extension wall members to adapt the car for gravity unloading, and
    (f) a conduit system extending transversely to the path of movement of the gate including:
        (1) a centrally located box-like casing disposed between the extension wall members in juxtaposition to the transverse wall of the receptacle,
        (2) a communicating opening between the chute receptacle and the casing portion of the conduit for admission of lading into the conduit system,
        (3) end conduit sections extending laterally from the respective side extension walls to present air and lading exit openings for connection with a source of reduced pressure,
        (4) air inlet openings at the opposite ends of the central casing section for the admission of entraining air,
        (5) valves for metering the entraining air,
        (6) control rods for operating the air inlet valves from a location adjacent the remotely located exit opening whereby the stream of air enters at the distal end of the casing and flows along the length of the communicating opening.

2. The invention set forth in claim 11 wherein the air inlet openings of the centrally disposed casin section of the conduit system are separated by a vertically extending V-shaped partition to restrict the central part of the conduit and provide a venturi action.

3. The invention set forth in claim 1 wherein:
    (a) removable caps close the air and lading exit openings of the conduit, and
    (b) latching means to retain the caps in closed position comprising:
        (1) oppositely swingable link members pivotally mounted on opposite sides of the conduit, and
        (2) a resilient bar pivotally mounted on one of the link members and extending across the cap in resilient contact therewith and connect with the opposite link,
        (3) a shoulder at one side of the pivotal connection of one of the link members, and
        (4) a handle portion on the control rod extending from the remote air inlet valve adapted to be engaged by the shoulder of the link member for retaining the air valve in closed position.

4. In a hopper car having an opening for selective discharge of lading either by gravity or pneumatic action, in combination,
    (a) a sliding gate for the opening;
    (b) a four-side chute-like receptacle below the gate for directing the flow of lading from the discharge opening,
    (c) one of the sides of the receptacle extending transversely beneath the gate,
    (d) laterally spaced extension wall members projecting forwardly from the said transverse wall to support the gate in open position,
    (e) a shiftable floor member arranged to function in one position as closure for the receptacle for operation as a pneumatic unloader and shiftable to a storage position beneath the extension wall members to adapt the car for gravity unloading, and
    (f) a conduit system extending transversely to the path of movement of the gate including:
        (1) a centrally located box-like casing disposed between the extension wall members in juxtaposition to the transverse wall of the receptacle,
        (2) a communicating opening between the chute receptacle and the casing portion of the conduit for admission of lading into the conduit system,
        (3) end conduit sections extending laterally from the respective side extension walls to present air and lading exit openings for connection with a source of reduced pressure whereby the stream of air enters at one of the distal ends of the casing and flows along the length of the communicating opening.

References Cited

UNITED STATES PATENTS 3,138,116   6/1964   Dorey _____ 214—83.28 XR
3,138,117   6/1964   Dorey _____ 214—83.28 XR GERALD M. FORLENZA, *Primary Examiner.*

ALBERT J. MAKAY, *Examiner.*